United States Patent

[11] 3,627,637

| [72] | Inventor | Urbahn A. Phillips<br>Gretna, La. |
|---|---|---|
| [21] | Appl. No. | 731,298 |
| [22] | Filed | May 22, 1968 |
| [45] | Patented | Dec. 14, 1971 |
| [73] | Assignee | Commercial Solvents Corporation<br>New York, N.Y.<br>Continuation-in-part of application Ser. No. 425,918, Jan. 15, 1965, now abandoned. This application May 22, 1968, Ser. No. 731,298 |

[54] PRODUCTION OF ORGANIC NITROGENOUS MATERIALS
5 Claims, No Drawings

| [52] | U.S. Cl. | 195/28 R, 195/28 |
|---|---|---|
| [51] | Int. Cl. | C12d 13/06 |
| [50] | Field of Search | 195/28 R, 3 H; 99/16 |

[56] References Cited
UNITED STATES PATENTS

| 3,308,035 | 3/1967 | Douros | 195/4 X |
|---|---|---|---|
| 3,418,208 | 12/1968 | Coty | 145/28 X |
| 3,222,258 | 12/1965 | Iizvka et al. | 195/3 H X |
| 3,326,771 | 6/1967 | Leavitt | 195/3 H |

*Primary Examiner*—A. Louis Monacell
*Assistant Examiner*—Max D. Hensky
*Attorneys*—Howard E. Post and Robert H. Dewey ABSTRACT: A process for the production of L-glutamic acid and proteinaceous material by cultivating *Mycobacterium phlei*, NRRL B-3423, in an aqueous fermentation medium containing an aliphatic hydrocarbon as an energy source, thereby producing L-glutamic acid and protein rich cells of *M. phlei*.

3,627,637

PRODUCTION OF ORGANIC NITROGENOUS MATERIALS

CROSS-REFERENCE TO RELATED APPLICATIONS

This application is a continuation-in-part of applicant's copending application Ser. No. 425,918, filed Jan. 15, 1965, now abandoned.

BACKGROUND OF THE INVENTION

This invention generally relates to a fermentation process for the production of organic nitrogenous materials. In a particular aspect this invention relates to a a process for the production of L-glutamic acid and a proteinaceous material by the fermentation of a nutrient fermentation medium containing an aliphatic hydrocarbon as an energy source with a strain of the micro-organism *Mycobacterium phlei* capable of utilizing an aliphatic hydrocarbon for growth.

The use of micro-organisms to produce food-flavoring agents and nutritional protein supplements by fermentation is well known. Generally, the materials used as a source of energy for the growing organism in fermentation processes consist largely of carbohydrates such as cereal starches and molasses plus other minor constituents required by the growing organism. In this manner are produced food yeasts, riboflavin, animal feed supplements, citric acid, L-glutamic acid and other significant nutritional materials.

Aliphatic hydrocarbons are potentially a source of energy to support the growth of micro-organisms but prior to 1962 this use of hydrocarbons had been studied only in the laboratory. Little attention was given to producing products on a commercial scale until in 1962, Champagnat and Filosa, French Pat. No. 1,297,619, and subsequent British Pat. Nos. 914,567 and 914,568, disclosed a process for commercial production of edible yeasts using aliphatic hydrocarbons as the energy source. The yeasts employed included a strain of Cryptococcacea, *Candida lipolytica* and *Saccharomyces cerevisiae*. Later, Takahashi et al., Agri. and Biol. Chem. (Japan) 27, 836–842 (1963), reported production of edible protein by *Pseudomonas aeruginosa* grown on a hydrocarbon-containing medium.

The prior art has taught the production of edible proteinaceous materials in commercial quantities by the growth of four species of micro-organisms on aliphatic hydrocarbons. Although these hydrocarbon-utilizing organisms can use other forms of organic matter for growth, they are characterized by their ability to use aliphatic hydrocarbons as a sole source of energy.

SUMMARY OF THE INVENTION

It is an object of this invention to provide a new process for the production of organic nitrogenous materials. Another object of this invention is to provide a new fermentation process for the production of L-glutamic acid and a proteinaceous material using a liquid aliphatic hydrocarbon as the energy source. Other objects will be readily apparent to those skilled in the art.

A new process has been discovered for the production of organic nitrogenous materials by cultivating a protein-producing and amino acid-producing strain of the micro-organism *Mycobacterium phlei* in an aqueous, nutrient, fermentation medium containing as an energy source a normally liquid aliphatic hydrocarbon and an assimilable nitrogen source. When the micro-organism has reached a desirable amount of growth, the protein-containing cells of the micro-organism may be separated from the fermentation medium, and are then useful as a source of protein, particularly for the formulation of animal feed compositions. The separated protein-containing cells may, of course, also be dried and then used as a source of protein. L-glutamic acid produced by the micro-organism is present in the fermentation medium and may be recovered therefrom by processes known to those skilled in the art. The new protein and amino acid producing strain of *Mycobacterium phlei* has been deposited with the U.S. Department of Agriculture, Northern Utilization Research and Development Division, Peoria, Ill., and is identified by the numerical designation NRRL B-3423. The culture is available to anyone who requests same.

It is surprising to obtain the advantageous results when using *Mycobacterium phlei* NRRL B-3423 with aliphatic hydrocarbons since it was not previously reported that *Mycobacterium phlei* could utilize a liquid aliphatic hydrocarbon as an energy source. Nor was it reported that the species *Mycobacterium phlei* could produce L-glutamic acid regardless of energy source.

Many micro-organisms are known to provide satisfactory yields of L-glutamic acid with fermentation media containing a carbohydrate source as the energy source, but these micro-organisms provide little or no L-glutamic acid when employed with the fermentation medium containing a liquid aliphatic hydrocarbon as the energy source. For example, the following micro-organisms were not satisfactory in a fermentation using a liquid aliphatic hydrocarbon as the energy source: *Brevibacterium divaricatum*, *Candida utilis*, *Aerobacter aerogenes*, *Escherichia coli*, *Bacillus cereus*, and *Nocardia coeliaca*. Furthermore, the yeasts which have previously been employed with a fermentation medium containing a liquid aliphatic hydrocarbon to provide proteinaceous materials are not known to provide significant quantities of L-glutamic acid.

In accordance with one embodiment of the process of the present invention, the micro-organism *Mycobacterium phlei* NRRL B-3423 is cultivated in an aqueous nutrient medium containing a normally liquid aliphatic hydrocarbon as an energy source at a temperature between about 25° C. and about 50° C. and preferably between about 27° C. and about 35° C. under submerged conditions of agitation and aeration. The nutrient medium, in addition to the liquid aliphatic hydrocarbon, contains an assimilable nitrogen source in either organic form, such as urea, or inorganic form, such as ammonium salts, e.g., ammonium chloride, ammonium sulfate, and ammonium tartrate. Also a source of phosphorus such as mono- or dipotassium or sodium phosphates is advantageously used to provide better yields. Other mineral salts such as those of magnesium, ferrous iron and manganese may also be utilized with desirable results. Growth factors, i.e. growth stimulant materials such as biotin, desthiobiotin, yeast extract, peptone, meat extracts, corn steep liquor, casein-hydrolyzate, wheat bran extracts and the like, may be utilized with desirable results at a concentration equivalent to about 1 g. of yeast extract per 50 ml. of hydrocarbon.

Preferably a large amount of oxygen is used in the fermentation. It is generally supplied in the form of sterile air at from about 1 to about 3 volumes of air per volume of liquid medium per minute and preferably about 1.5 vol./min. A high rate of agitation is preferably provided to insure proper dispersal of oxygen and hydrocarbon throughout the growth medium. Agitation is customarily achieved by a rotary agitator operated at 1,000 to 2,000 r.p.m. Foaming usually does not become a problem, but when it does, an antifoam agent may be added. The pH of the medium is preferably maintained between about 6.0 and about 8.0, and more preferably at about 7.2. As the fermentation progresses pH decreases due to acid production and may be readjusted by addition of a base, such as ammonium hydroxide. The fermentation ordinarily is completed within 1 to 3 days' time when conducted under aeration-agitation conditions although shorter or longer times may be used if desirable.

The protein produced as a result of the fermentation of aliphatic hydrocarbons is contained in the cells of the micro-organism. These cells can be removed from the fermentation medium by any known means. Centrifugation, filtration or precipitation by alcohol or acetone are examples of methods usually used. If desired, the cellular proteinaceous material may be further purified by extraction with suitable solvents or addition of surface active agents to remove residual hydrocarbon from the cells, followed by washing in distilled water. The product may subsequently be partially dried to a water content of from about 15 percent to about 25 percent by weight and preferably to about 20 percent at a temperature of from about 80° C. to about 100° C. It may then be powdered by means known in the art and is ready for use.

The L-glutamic acid produced as a result of the fermentation of aliphatic hydrocarbons is contained in the fermentation medium. The cells of the micro-organism are generally first removed from the fermentation medium and the L-glutamic acid is then recovered from the cell-free medium. Methods of recovery of L-glutamic acid are known to those skilled in the art; any of these methods may be employed. For example, the recovery process described in U.S. Pat. No. 2,978,383 is useful to recover the glutamic acid.

The strain of *Mycobacterium phlei*, NRRL B–3423, possesses the characteristics listed in table 1. It is distinctive over the type strain as described in Bergey's Manual of Determinative Bacteriology 7th Ed., 1957, page 697, in the following respects:

1. It can utilize certain liquid aliphatic hydrocarbons as a sole source of energy.
2. It can produce significant amounts of L-glutamic acid extracellularly from a hydrocarbon substrate.
3. It grows prolifically with high cell yields on a hydrocarbon substrate.
4. It produces a carotenoid pigment from either a hydrocarbon or carbohydrate-based substrate.
5. It possesses constitutive enzyme systems which enable it to metabolize carbohydrates or aliphatic hydrocarbons interchangeably with no lag in growth.
6. It does not produce acid from mannitol, sorbitol or arabinose.

TABLE 1

Characteristics of Mycobacterium phlei NRRL B–3423
A. Morphological characteristics:
  1. Vegetative cells: rods, 2 – 5 microns long (average 3). Occasionally club-shaped at one end. Occur singly and in clusters.
  2. Motility: none
  3. Spore formation: none
  4. Gram stain: positive
  5. Acid-fast stain: positive
B. Cultural characteristics:
  1. Nutrient broth: ring with pellicle formed at 48 hours.
  2. Agar stroke: growth rough, thin, and spreading with pale yellow tinge, becoming thick, waxy, wrinkled and orange after prolonged incubation.
  3. Agar colony: umbonate, circular, undulate, waxy and orange pigmented.
C. Physiological characteristics:
  1. Gelatin: not liquefied
  2. Litmus milk: reduced with acid curd
  3. Indole: not produced
  4. Nitrate: reduced to nitrites
  5. Starch: hydrolyzed
  6. $H_2S$: not produced
  7. Utilization of Kreb's cycle intermediates: acetate, citrate, malate and succinate utilizes as sole carbon sources.
  8. Carbohydrate fermentation: acid with no gas from glucose, maltose, mannose, sucrose, trehalose, xylose and fructose; no acid from mannitol, sorbitol and arabinose.
  9. Temperature for growth: optimum 30° C., growth from 25° to 50° C.
  10. Sensitivity to dyes: inhibited by 0.01 percent malachite green and crystal violet. No growth on MacConkey's Agar.
  11. Urease: positive
  12. Utilization of aromatic acid: benzoate not utilized.

The liquid aliphatic hydrocarbon can be any normally liquid aliphatic hydrocarbon or mixture of hydrocarbons preferably having from about six carbon atoms to about 20 carbon atoms in the molecule, and more preferably 10 to 16, and mixtures thereof. Preferably the mixture consists principally of saturated, straight-chain hydrocarbons. A satisfactory mixture can be obtained by the distillation of petroleum hydrocarbons. The fraction having an initial boiling point above about 95° F. and an end point below about 800° F. is useful as the hydrocarbon source for the practice of this invention. The liquid aliphatic hydrocarbon may be one obtained by distillation of a crude oil or it may also be a fraction recovered from a thermal or catalytic cracking operation. Gasoline, naphtha, burning oils kerosene, distillate fuels, gas oils and diesel fuels are suitable hydrocarbon fractions. It is not necessary that the hydrocarbon fraction be free from aromatic, branched-chain, and unsaturated aliphatic hydrocarbons; however, *Mycobacterium phlei* NRRL B–3423 does not generally provide satisfactory growth from aromatic, branched-chain, and unsaturated aliphatic hydrocarbons. Although the preference of the micro-organism is for normal alkanes, the presence of other types of hydrocarbons does not generally inhibit the growth of the micro-organism nor the production of L-glutamic acid provided the normal alkanes are present in an amount sufficient to provide the energy necessary for satisfactory growth.

Kerosene is a specifically preferred liquid aliphatic hydrocarbon mixture. Kerosene is the hydrocarbon fraction usually having an initial boiling point of about 370° F. and an end point of about 620° F. with a gravity generally of about 35 to 50 API and is composed almost entirely of saturated hydrocarbons of from about 10 to about 16 carbon atoms. The preference of the organism for this hydrocarbon mixture is shown by the manometric data in table 2.

Table 2

Oxidation of Hydrocarbons by

Mycobacterium phlei NRRL B–3423

| Substrate | Formula | Microliters of $O_2$ Consumed in 2.5 hrs. |
|---|---|---|
| Hexane | $C_6H_{14}$ | 281.1 |
| Naphtha | $C_6$–$C_{10}$ | 341.1 |
| Decane | $C_{10}H_{22}$ | 497.7 |
| Undecane | $C_{11}H_{24}$ | 468.6 |
| Dodecane | $C_{12}H_{26}$ | 552.2 |
| Tridecane | $C_{13}H_{28}$ | 641.8 |
| Tetradecane | $C_{14}H_{30}$ | 684.1 |
| Hexadecane | $C_{16}H_{34}$ | 720.4 |
| Kerosene | $C_{10}$–$C_{16}$ | 584.4 |
| Paraffin oil | $C_{18}$ & above | 434.8 |
| Toluene | $C_6H_5CH_3$ | 66.2 |
| Xylene (o,m,&p) | $C_6H_4(CH_3)_2$ | 91.5 |
| Phenol | $C_6H_5OH$ | 34.5 |
| Benzene | $C_6H_6$ | 31.5 |
| Endogenous* | | 66.2 |

*Normal respiration of *Mycobacterium phlei* in absence of substrate

The kerosene or other liquid aliphatic hydrocarbon is generally employed in the fermentation medium in amounts of from about 0.1 to 10 percent by volume, but preferably from about 1 percent to about 5 percent by volume.

It is preferred to employ along with the kerosene or other liquid aliphatic hydrocarbon a small amount of a dispersing agent to insure dispersion of the hydrocarbon throughout the aqueous fermentation medium. Suitable dispersants include cationic surface active reaction products of ethylene oxide and aliphatic amines having 10 to 30 carbon atoms per molecule, nonionic polyoxyethlene derivatives of hexitol anhydride, nonionic surface active alkyl aryl polyether alcohols having the general formula $R$—$(O$—$CH_2$—$CH_2)_n$—$OH$ where $R$ is an alkyl alcohol and $n$ is an integer of about five to 100 or more. The amount of dispersant utilized may vary but in each case is sufficient to provide an effective dispersion. Ordinarily the amount of dispersant, if utilized, will fall in the range of about 0.00025 to 0.05 percent by weight, preferably 0.001 to 0.01 percent by weight.

The inoculum for the fermentation may be prepared y growing the organism or either a carbohydrate or hydrocarbon based medium. Any medium which provides suitable growth will suffice. Degree of growth is customarily measured by the extent of light absorption when a beam of light is passed through a diluted portion of the inoculum. An optical density of 0.03 or higher after a 1:50 dilution is an indication of aforesaid suitable growth. A commercially available carbohydrate-based medium has been generally used. A typical commercial medium which has been used successfully is Trypticase Soy Broth, Baltimore Biological Laboratories, Baltimore, Maryland.

The examples given below are for purposes of illustration only and this invention is not limited to the specific ingredients or amounts thereof or to the other specific operating conditions other than previously broadly set forth herein.

EXAMPLE 1

The inoculum was prepared by growing *Mycobacterium phlei* NRRL B–3423 for 18 hours at 30° C. on a medium having the following compositions:

| | |
|---|---|
| Pancreatic digest of casein | 17.0 g. |
| Papaic digest of soyameal | 3.0 g. |
| Sodium chloride | 5.0 g. |
| Dipotassium hydrogen phosphate | 2.5 g. |
| Dextrose | 2.5 g. |
| Water | 1,000 ml. |

The medium was agitated on a rotary shaker at 385 r.p.m. throughout the 18-hour growth period.

The pancreatic digest of casein was Trypticase obtained from Baltimore Biological Laboratories, Baltimore, Maryland. The papaic digest of soyameal was Phytone, also obtained from Baltimore Biological Laboratories.

A fermentation medium having the following composition was separately prepared:

| | |
|---|---|
| Magnesium sulfate ($MgSO_4 \cdot 7H_2O$) | 6.0 g. |
| Dipotassium phosphate | 24.0 g. |
| Ammonium sulfate | 48.0 g. |
| Manganese sulfate ($MnSO_4 \cdot H_2O$) | 4 p.p.m. |
| Ferrous sulfate ($FeSO_4 \cdot 7H_2O$) | 4 p.p.m. |
| Yeast extract | 6.0 g. |
| Dispersing agent | 0.090 g. |
| Water | 5,700 ml. |
| Kerosene | 285 ml. |

The yeast extract was BYF–100, obtained from Amberlabs, Inc., Milwaukee Wis. and the dispersing agent was the polyoxyethylene derivative of hexitol anhydride partial long chain fatty acid.

Approximately 3 liters of the above fermentation medium were placed in a laboratory fermentor and the contents were sterilized for 15 minutes at 115° C. and 10 p.s.i.g. pressure.

A 100 ml. portion of the inoculum was added to the fermentation medium in the laboratory fermentor and a fermentation was conducted at 30° c. for about 3 days. During the fermentation period the fermentor was agitated by a rotary stirrer at 1750 r.p.m. and the pH was adjusted at 24, 48, and 72 hours using normal ammonium hydroxide. Sterilized air was passed through the fermentation medium at the rate of 1.7 volumes per volume of medium per minute at a back pressure on the fermentor of 2 p.s.i.g. This rate of airflow is equal to 5.1 liters per minute at 30° C. and 2 p.s.i.g.

The results of the fermentation are given below:

| Time (hrs.) | Adjusted pH | % Light transmission | L-glutamic acid | Proteinaceous material, dry |
|---|---|---|---|---|
| 24 | 7.3 | 87.0 | 0 | — |
| 48 | 7.7 | 72.5 | 2.5 | — |
| 72 | 8.8 | 49.0 | 5.5 | 16.4 |

Assay (g./l.

EXAMPLE 2

The inoculum employed in this example was prepared as described in example 1, except that the organism was grown for 24 hours. A 50 ml. portion of the inoculum was added to a fermentor containing 3,000 ml. of media having the following composition:

| | |
|---|---|
| Magnesium sulfate ($MgSO_4 \cdot 7H_2O$) | 1.5 g. |
| Dipotassium phosphate | 6.0 g. |
| monopotassium phosphate | 1.5 g. |
| Ammonium sulfate | 12.0 g. |
| Manganese sulfate ($MnSO_4 \cdot 7H_2O$) | 2 p.p.m. |
| Ferrous sulfate ($FeSO_4 \cdot 7H_2O$) | 4 p.p.m. |
| Yeast extract | 3.0 g. |
| Dispersing agent | 0.015 g. |
| Kerosene | 150 ml. |
| Tap water | 2,850 ml. |
| pH | 7.2 |

The dispersing agent used was the same as in example 1. The fermentation was carried out at 30° C. for 72 hours. Additional 75 ml. portions of kerosene were added at 29 and 55 hours, bringing the total amount of kerosene used to 10 percent (v/v). Agitation was provided by a rotary stirrer operated at 1,750 r.p.m. with aeration of 1.7 volumes of sterile air per volume of medium per minute. At the end of 72 hours, the L-glutamic acid assay showed 3.0 g./l. An equal amount of acetone was added to the growth medium to precipitate the cellular proteinaceous material which was then filtered, dried at 100° C. for 24 hours and weighed; 53 grams of dry proteinaceous material was recovered.

EXAMPLE 3

The fermentation described in example 2 was repeated except that no additional kerosene was added during the course of the fermentation so that the total amount of kerosene used remained at 5 percent (v/v). After 72 hours fermentation, the medium assayed 2.3 g./l. of L-glutamic acid and 58 grams (19.3 g./l.) of dried proteinaceous material was obtained.

EXAMPLE 4

The fermentation described in example 3 was repeated except that this time pH was maintained near neutrality by additions of normal ammonium hydroxide solution. At the end of the fermentation, the medium assayed 5.0 g./l. of L-glutamic acid and 59.4 g. (19.8 g./l.) of dried proteinaceous material was recovered.

EXAMPLE 5

A 50 ml. portion of an inoculum prepared as described in example 1 was added to a fermentor containing 3,000 ml. of media composed as follows:

| | |
|---|---|
| Magnesium sulfate ($MgSO_4 \cdot 7H_2O$) | 3.0 g. |
| Dipotassium phosphate | 12.0 g. |
| Ammonium sulfate | 24.0 g. |
| Manganese sulfate ($MnSO_4 \cdot H_2O$) | 4 p.p.m. |
| Ferrous sulfate ($FeSO_4 \cdot 7H_2O$) | 4 p.p.m. |
| Yeast extract | 3.0 g. |
| Dispersing Agent | 1.5 g. |
| Kerosene | 150 ml. |
| Tap water | 2,850 ml. |
| pH | 7.2 |

The dispersing agent used was the same as in example 1. The fermentation was carried out at 30° C. for 72 hours with agitation provided by a rotary stirrer operated at 1,750 r.p.m. and aeration of 1.7 volumes of sterile air per volume of medium per minute. At the end of the fermentation period, the growth medium assayed 4.5 g./l. of L-glutamic acid, and 58.2 g. (19.4 g./l.) of dried proteinaceous material was obtained.

EXAMPLE 6

A sample of the proteinaceous material recovered in example 1 was analyzed for its constituents. The following results, dry basis, were obtained:

| | |
|---|---|
| Ash | 19.0% |
| Lipid | 12.6% |
| Protein | 60.7% |
| Carbohydrate | 7.7% |

Vitamin assay, dry basis, disclosed the following members of the vitamin B group:

| | |
|---|---|
| Niacin | 103.7 µg./g. |
| Riboflavin | 57.6 µg./g. |
| Cobalamine | 0.77 µg./g. |
| Pantothenic acid | 9.54 µg./g. |
| Pyridoxine (approx.) | 5 µg./g. |
| Thiamine | 0.9 µg./g. |

A sample of the proteinaceous material obtained in example 1 was hydrolyzed and analyzed for amino acid content. The results are given in table 3 along with comparative data on the amino acid content of other common nutritional substances.

TABLE 3.—AMINO ACID CONTENT OF SOME PROTEINACEOUS MATERIALS

| Percent | M. phlei | Brewer's yeast | Soybean meal | Torula yeast | Baker's yeast | Fish meal |
|---|---|---|---|---|---|---|
| Amino acid: | | | | | | |
| Alanine | 9.0 | | | | | |
| Arginine | 5.0 | 13.1 | 7.3 | 8.6 | 5.0 | 5.4 |
| Aspartic acid | 10.0 | | | | | |
| Cysteic acid | 0.6 | | | | | |
| Glutamic acid | 9.6 | | | | | |
| Glycine | 4.3 | | | | | |
| Histidine | 2.0 | 3.0 | 2.3 | 2.8 | 4.1 | 2.6 |
| iso-Leucine | 2.7 | 6.0 | 6.2 | 5.5 | 4.5 | 6.0 |
| Leucine | 6.9 | 7.8 | 7.3 | 8.3 | 7.5 | 7.1 |
| Lysine | 8.7 | 7.4 | 7.2 | 6.8 | 6.7 | 9.8 |
| Methionine | 2.6 | 2.3 | 2.0 | 2.6 | 1.4 | 3.0 |
| Phenylalanine | 3.1 | 3.6 | 5.7 | 4.5 | 5.6 | 4.4 |
| Proline | 3.5 | | | | | |
| Serine | 4.3 | | | | | |
| Threonine | 5.1 | 5.1 | 3.7 | 4.9 | 5.5 | 4.1 |
| Tryptophane | 1.6 | 1.6 | 1.6 | 0.8 | | 1.0 |
| Tyrosine | 2.0 | | | | | |
| Valine | 4.9 | 6.4 | 5.1 | 5.9 | 9.4 | 5.8 |

NOTE.—Basis: 16% nitrogen in protein.

EXAMPLE 7

The proteinaceous material obtained in example 1 is employed as a protein source in a poultry broiler ration having the following composition:

| | |
|---|---|
| Corn | 27.5% |
| Milo | 23.0% |
| M. phlei protein | 30.25% |
| Corn gluten meal | 5.0% |
| Fish meal | 2.5% |
| Poultry byproduct | 2.5% |
| Fish solubles | 2.0% |
| Salt | 0.25% |
| Dicalcium phosphate | 2.0% |
| Molasses | 5.0% |

This ration is used as the total feed for poultry broilers.

EXAMPLE 8

The proteinaceous material obtained in example 1 is employed as a protein source in a pig starter ration having the following composition:

| | |
|---|---|
| Milo | 34.0% |
| Corn | 33.5% |
| M. phlei protein | 16.5% |
| Meat and bone scraps | 5.0% |
| Sucrose | 5.0% |
| Dried brewer's yeast | 1.5% |
| Distiller's dried solubles | 1.5% |
| Condensed fish solubles | 2.0% |
| Dicalcium phosphate | 0.5% |
| Trace mineral salt | 0.5% |

This ration is used as the total feed for baby pigs.

EXAMPLE 9

The proteinaceous material obtained in example 1 is employed as a protein source in a cattle supplement feed having the following composition:

| | |
|---|---|
| M. phlei protein | 40.0% |
| Molasses | 14.0% |
| Alfalfa meal | 14.0% |
| Corn | 21.0% |
| Urea | 4.0% |
| Dicalcium phosphate | 5.0% |
| Trace mineral salt | 2.0% |

This ration is used as a feed supplement along with hay for raising cattle.

EXAMPLE 10

The proteinaceous material obtained in example 1 is employed as a protein source in a lamb fattening feed having the following composition:

| | |
|---|---|
| Barley | 63.0% |
| M. phlei protein | 5.0% |
| Oats | 15.0% |
| Beet pulp | 15.0% |
| Dicalcium phosphate | 1.0% |
| Salt | 1.0% |

This ration is used as the total feed for lambs.

EXAMPLE 11

The proteinaceous material obtained in example 1 is employed as a protein source in a dog food having the following composition:

| | |
|---|---|
| Corn flakes | 20.0% |
| Wheat flakes | 20.0% |
| Oat groats | 24.0% |
| M. phlei protein | 16.0% |
| Fish meal | 5.0% |
| Meat and bone scraps | 5.0% |
| Dried skim milk | 4.0% |
| Dried Brewer's yeast | 1.0% |
| Fat | 3.0% |
| Dicalcium phosphate | 1.5% |
| Salt | 0.5% |

This dog food preparation is used as the total food source for dogs.

EXAMPLE 12

The proteinaceous material obtained in example 1 is employed as a protein source in a horse and mule feed having the following composition:

| | |
|---|---|
| Rolled oats | 70.0% |
| M. phlei protein | 5.0% |
| Alfalfa meal | 5.0% |
| Wheat bran | 5.0% |
| Wheat middlings | 5.0% |

| | |
|---|---|
| Molasses | 9.0% |
| Dicalcium phosphate | 0.5% |
| Salt | 0.5% |

This preparation is used as a total feed for horses and mules.

EXAMPLE 13

The proteinaceous material obtained in example 1 is employed as a protein source in a turkey grower feed having the following composition:

| | |
|---|---|
| Corn | 18.0% |
| Wheat | 40.0% |
| M. phlei protein | 30.0% |
| Alfalfa leaf meal | 2.0% |
| Fish meal | 2.0% |
| Meat and bone scraps | 2.0% |
| Molasses | 3.0% |
| Dicalcium phosphate | 2.7% |
| Salt | 0.3% |

This preparation is used as a total feed for growing turkeys.

I claim:

1. A process for the production of L-glutamic acid and proteinaceous material comprising
   a. cultivating *Mycobacterium phlei* NRRL B–3423 in an aqueous fermentation medium containing a normally liquid aliphatic hydrocarbon and an assimilable nitrogen source, under conditions of aeration and agitation, at a temperature of from about 25° C. to about 50° C., at a pH of from about 6.0 to 8.0, thereby producing L-glutamic acid and proteinaceous material,
   b. recovering said proteinaceous material from the resultant fermentation medium, and
   c. recovering said L-glutamic acid from the resultant fermentation medium.

2. The process of claim 1 wherein said cultivation takes place at a temperature ranging from about 27° C. to about 35° C. at a pH of from about 7.0 to about 7.5.

3. The process of claim 1 wherein the medium contains an assimilable phosphorous source, a growth factor equivalent to about 1 g. of yeast extract per 50 ml. of said hydrocarbon, and the normally liquid aliphatic hydrocarbon is dispersed in the medium with a dispersing agent for dispersing hydrocarbon in an aqueous media.

4. The process of claim 1 wherein said normally liquid aliphatic hydrocarbon has from about six to about 20 carbon atoms in the molecule and mixtures thereof, and has an initial boiling point of about 95° F. and an end point below about 800° F., and is present in an amount of from about 0.1 percent to about 10 percent by volume of the fermentation medium.

5. The process of claim 1 wherein said normally liquid aliphatic hydrocarbon is kerosene.

* * * * *

PO-1050
(5/69)

UNITED STATES PATENT OFFICE
CERTIFICATE OF CORRECTION

Patent No. 3,627,637            Dated December 14, 1971

Inventor(s) Urbahn A. Phillips

It is certified that error appears in the above-identified patent and that said Letters Patent are hereby corrected as shown below:

Column 4, line 69, "polyoxyethlene" should be --polyoxyethylene--.

Column 4, line 72, "alkyl alcohol" should be --alkyl aryl alcohol--.

Column 5, line 3, "y" should be --by--.

Column 5, line 4, "or", first occurence, should be --on--.

Column 5, line 9, "0.03" should be --0.3--.

Column 7, Table 3, 6th column, cancel ">".

Signed and sealed this 27th day of June 1972.

(SEAL)
Attest:

EDWARD M. FLETCHER, JR.          ROBERT GOTTSCHALK
Attesting Officer                 Commissioner of Patents